INVENTORS
DONALD H. RIST
JAMES R. WHITTEN
BY
HIS ATTORNEY

INVENTORS
DONALD H. RIST
JAMES R. WHITTEN
BY
HIS ATTORNEY

United States Patent Office 3,450,875
Patented June 17, 1969

3,450,875
RAIL VEHICLE CONTROL SYSTEM
James R. Whitten, Scotia, N.Y., and Donald H. Rist, Erie, Pa., assignors to General Electric Company, a corporation of New York
Filed Feb. 20, 1967, Ser. No. 617,100
Int. Cl. B61l 21/06
U.S. Cl. 246—34       7 Claims

ABSTRACT OF THE DISCLOSURE

A track circuit includes an "earthed" third conductor mounted near (preferably between) the track rails so as to be sensitive to ballast impedance changes. Two separate signals are provided one of which is applied across one rail and the third conductor and the other across the other rail and the third conductor. This arrangement provides one signal which is sensitive to ballast impedance changes and the presence of a vehicle while the other signal is sensitive only to ballast impedance changes. A detector is connected to the track circuit and is arranged to obtain the ratio of the two signals so that vehicle presence or absence between the signal sources and the detector will be reliably indicated under varying ballast conditions.

---

The present invention relates to rail vehicle control systems, and more particularly relates to systems wherein the speed and/or location of one rail vehicle is controlled relative to the location of another rail vehicle.

In systems for controlling the spacing of rail vehicles travelling on the same track in the same direction it is necessary to detect the location of the advance train and to relay this information to the succeeding train which can then adjust its speed accordingly. Generally the location is determined by dividing the right of way into a plurality of zones and then detecting the zone in which the advance train is located. In the past, the location of the advance train within a particular zone was determined by detecting the degree of change in preexistent current or voltage level within the zone caused by the presence of a train within the zone. The wheels and axle of the train shunted the preexistent current or voltage signal in the zone and a threshold detector was arranged to cease producing an output when the detected current and voltage level dropped below a predetermined threshold level. The fact of cessation of the detector output signal was then relayed to the succeeding train which adjusted its speed accordingly. Such prior systems had the disadvantage that it was difficult to distinguish between a drop in current or voltage level caused by the presence of a train within the zone and that caused by the shunting effect of wet ballast or ties, due to adverse weather conditions. As a result, very sensitive detectors were required to determine whether the drop in level was caused by a train or merely by wet ballast.

Accordingly, it is an object of the present invention to provide a system of train detection which is independent of weather conditions.

A further object is to provide a train detection system which does not rely on sensitivity to the difference in degrees of current or voltage levels to distinguish between the changes caused by the shunting effect of a rail vehicle and that caused by wet ballast and ties.

A still further object is to provide a train detection system which enables communication to be conducted between trains without having the signals shorted out by an intervening train.

The invention generally contemplates using a third conductor paralleling the track rails, forming a plurality of sequential zones, each of which has a first circuit including the third conductor and one of the rails, and a second circuit including the third conductor and the other rail, transmitting a first signal additively in the circuits and a second signal subtractively in the circuits, and determining zone occupancy by comparing the signals received at the far end of the zone.

In a more specific aspect of the invention comparison is made by deriving a ratio between the additive first signal and subtractive second signal and producing a first output when a train is absent as indicated by the presence of the ratio and a second output when a train is present as indicated by a change in the ratio.

Further objects and advantages will be apparent from the description of the invention and the drawings wherein.

Figure 1:
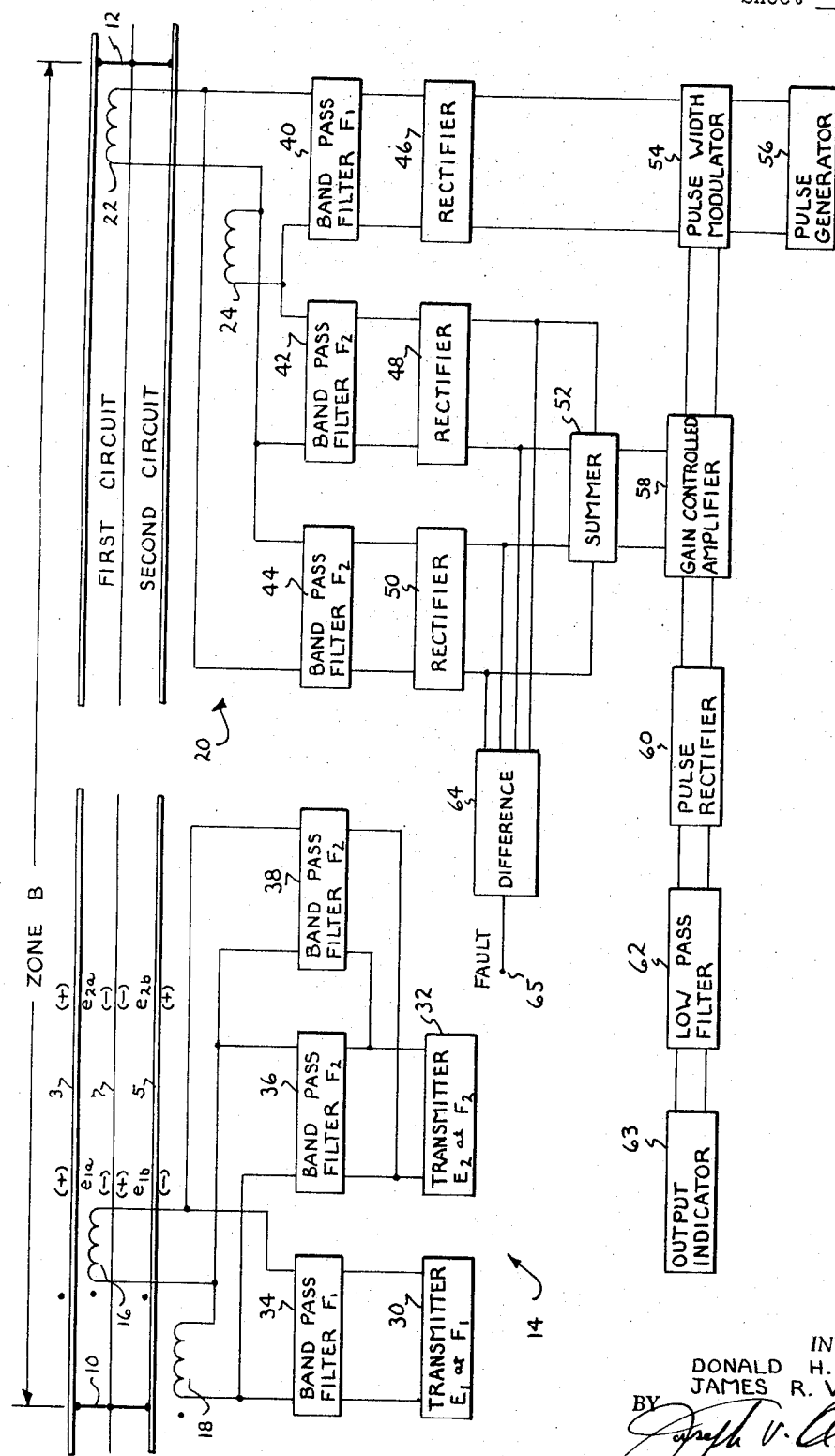
FIG. 1 is a fragmentary schematic view of a system in accordance with one embodiment of the invention.

Referring again to the drawings, FIG. 1 shows a preferred embodiment utilizing a third conductor 7. A first signal $E_1$ is transmitted so that the signals in the rails 3 and 5 of the zone are of opposite polarity with respect to the third conductor. A second independent signal $E_2$, such as a signal of a different frequency but the same magnitude as $E_1$, is transmitted so that the signals in the rails 3 and 5 of the zone are of the same polarity with respect to the third conductor 7. By the foregoing arrangement a train in the zone shunts only signal $E_1$ whereas adverse weather causes a shunting effect on both signals $E_1$ and $E_2$. By detecting the signals received at the end of the zone and comparing them, the presence or absence of a train is determined independently of weather conditions.

It is preferred that the third conductor be an open conductor mounted between the rails such as by being fastened to conducting stakes (not shown) and driven into the ballast and cross-ties (not shown). The third conductor may, however, be any open conductor mounted along the wayside such as a third rail power distribution circuit as long as it is periodically "earthed" such as by suitable series resonant circuits, or the like, connected from the third rail to earth. Alternatively, the third conductor may be a D.C. or A.C. power distribution wire which is similarly "earthed" periodically.

The track rails are divided into a series of separate zones, only one of which is shown in FIG. 1. The limits of the zone may be defined in any suitable manner, such as by the use of conventional insulated track joints or, if continuously conductive track rails are employed, by the use of suitable series resonant circuits or low impedance bonds connected across the rails. It is preferred that the third conductor 7, coact with the rails 3 and 5 and a plurality of low impedance or "shorting" bars to form a series of sequential zone track circuits along the right of way. FIG. 1 illustrates one such zone formed by the track rails 3 and 5 and the third conductor 7 with the limits of the zone defined by the shorting bars 10 and 12. Each shorting bar is connected across the rails and to the conductor 7. As a result, two independent circuits are formed in each zone. The first circuit is comprised of rail 3, third conductor 7 and the respective shorting bars 10 and 12. The second circuit is formed by rail 5, third conductor 7 and the respective shorting bars 10 and 12.

Each zone has a transmitting means, shown generally at 14, operably connected to the two circuits such as by the coupling coils 16 and 18 respectively. The transmitting means may include two separate transmitters 30 and 32 for generating respective signals $E_1$ and $E_2$ at different frequencies $F_1$ and $F_2$ which by suitable gain adjustment may be made to be of equal magnitudes. The $E_1$ signal, at frequency $F_1$, has components $e_{1a}$ and $e_{1b}$ which are coupled in the respective first and second circuits as indicated by the plus and minus signs in FIG. 1 so as to be of opposite polarity with respect to the third conductor 7. The signal at frequency $F_2$, having components $e_{2a}$ and $e_{2b}$, is coupled to th esame circuits but in a sense whereby they have the same polarity with respect to conductor 7 as indicated by the plus and minus signs associated with signals $e_{2a}$ and $e_{2b}$ in FIG. 1. This polarity arrangement may be achieved in any suitable manner and is shown as being conveniently provided by arranging the two coils 16 and 18 in series with the $F_1$ transmitter 30, but in parallel with the $F_2$ transmitter 32. In order to prevent shorting of the signals in connecting them to the tracks, the output from transmitter 30 is fed to band pass filter 34 and the output from transmitter 32 is fed to a pair of band pass filters 36 and 38.

Figure 2:
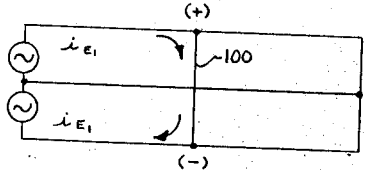
FIG. 2 is an equivalent circuit illustrating the shorting effect of the wheels and axle of a train on the $E_1$ signal.
Figure 3:
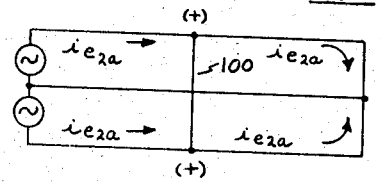
FIG. 3 is an equivalent circuit illustrating the lack of effect of the wheels and axle of a train on the $E_2$ signal.

A receiving means, indicated generally at 20, is located adjacent the far end of each zone to receive the signals which reach it. These are the signals which have not been completely short-circuited by a train. For example, when there is no train in the zone, each of the signals $e_{1a}$, $e_{1b}$, $e_{2a}$ and $e_{2b}$ will be received by the receiving means 20. However, when a train (not shown) enters the zone, the wheels and axle of the train shunt the rails 3 and 5 of the zone but not the third conductor 7, as indicated in the equivalent circuit of FIG. 2 wherein conductor 100 represents the shunting impedance presented by the wheels and axle assembly of the rail vehicle. Since the rails are at opposite polarity for signal $E_1$, due to the polarity arrangement of signal $E_1$, as indicated by the plus and minus signs in FIG. 2, a potential difference exists across the shunting wheel and axle assembly (conductor 100), and signal $E_1$ is essentially short-circuited. The wheels and axle of a train, which may have a shunting resistance of from essentially zero to about two ohms, causes signal $E_1$ to be either completely removed or greatly reduced thereby resulting in insufficient $E_1$ signal being received by the receiving means 20 to maintain the indicator thereof energized. By contrast, as illustrated by the equivalent circuit of FIG. 3, the shunting impedance presented by a train has no effect on the $E_2$ signal since the rails 3 and 5 are at the same polarity for the $E_2$ signal due to the polarity arrangement, as indicated by the plus and minus signs in FIG. 3; as a result, the wheels and axle assembly (conductor 100 in FIG. 3) has no effect whatever on signal $E_2$. The $E_2$ signal therefore will be received by the receiving means 20 at the same level it would have had if a train had been absent thereby maintaining the indicator thereof energized.

By comparing the $E_1$ signal (if any) received by the receiving means 20 to the $E_2$ signal received by it, an indication of the presence or absence of a train is provided which is independent of the shunting effects caused by adverse weather. A preferred method of comparing the $E_1$ and $E_2$ signals at the receiving means 20 is to derive a ratio between the signals. Since the shunting impedance due to adverse weather will shunt between one or both of the rails and the third conductor 7, the $E_1$ and $E_2$ signals will be affected equally since, as shown by the plus and minus signs in FIG. 1, a potential difference exists for both signals between each rail and the third conductor. Thus the ratio between $E_1$ and $E_2$ which existed for dry weather conditions will also exist for wet weather since the level of $E_1$ and $E_2$ will be affected equally. It is evident, therefore, that the ratio of $E_1$ to $E_2$ is independent of weather effects. The ratio of $E_1$ to $E_2$ will be changed, however, by the presence of a train, since, as previously stated, the presence of a train lowers the $E_1$ signal level but not the $E_2$ signal level and the ratio will approach or equal zero. Thus the presence or absence of a train can be determined by detecting whether the ratio is at a predetermined level or has dropped substantially below it.

Since changes in the ratio level are independent of the shunting effects of weather, a system is provided whereby when the system is operating, the change in output level is caused only by the presence of a train, thereby ensuring accuracy of detection without relying on detector sensitivity to detect whether a change in output signal level is caused by a train or adverse weather.

FIG. 1 illustrates one method of picking up the signals which reach the receiving means 20 and comparing them to determine train presence or absence. The receiving means, indicated generally at 20, is operably connected to the first and second circuits by coils 22 and 24 which are connected to the circuit similar to the connections for the coils 16 and 18 of transmitting means 14. As with the transmitting means, the coils 22 and 24 are connected in series with a band pass filter 40 and in parallel with band pass filters 42 and 44. This arrangement is identical to the arrangement of the transmitting means 14 and is similarly designed to avoid short circuiting at the receiving end of the system.

The output of filters 40, 42 and 44 are fed to respective rectifiers 46, 48 and 50 wherein the signals are changed to corresponding DC signals. The output from rectifier 46 is the equivalent of the $E_1$ signal. The outputs from rectifiers 48 and 50 are fed to a summer 52, the output of which comprises the equivalent of the total $E_2$ signal. The ratio of the $E_1$ signal to the $E_2$ signal is then determined. The output of rectifier 46, which is the $E_1$ signal, is fed to a pulse width modulator 54 which varies the width of a pulse supplied by the pulse generator 56 in accordance with the magnitude of the voltage of the signal $E_1$. The $E_2$ equivalent output from summer 52 and the $E_1$ equivalent output from pulse width modulator 54 are fed to a gain controlled amplifier 58 the output of which is arranged to be inversely proportional to the $E_2$ input signal. The output of gain controlled amplifier 58, therefore, represents the ratio of the voltages of signal $E_1$ to the signal $E_2$. This output is then fed to a rectifier 60 where the ratio is changed to a unidirectional voltage pulse. The output from rectifier 60 is then fed to low pass filter 62 which removes any alternating current component. The output of low pass filter 62 is thus a direct current output signal of a particular level irrespective of weather conditions. The presence of such output or either its absence or a drop in its level may be used to warn a succeeding train of the respective zone nonoccupancy or occupancy.

Figure 4:
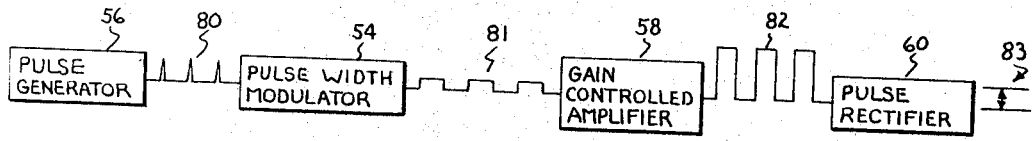
FIG. 4 is a fragmentary schematic view of the ratio detection means.

In FIG. 1, the various elements are shown in block form as the particular details of these various elements are not necessary to an understanding of the present invention and since they may be of any suitable type. For a better understanding of the particular arrangement just described, however, reference may be had to FIG. 4. As shown, pulse generator 56 may be a low duty factor stable repetitive pulse generator which generates equally spaced pulses 80. Similarly, pulse width modulator 54 may be of any suitable type operative to vary the width of pulses 80 in accordance with the magnitude of the input signal $E_1$ applied thereto to provide output pulses such as shown at 81. For example, the $E_1$ signal may control the amount of charge on a capacitor periodically charged and then discharged to an arbitrary voltage within a linear region of an RC curve—the time for discharge being a linear function of initial charge. Also, any suitable gain controlled amplifier 58 may be used wherein the output is inversely proportional to the $E_2$ input signal so that the output therefrom may be as shown at 82.

Figure 5:
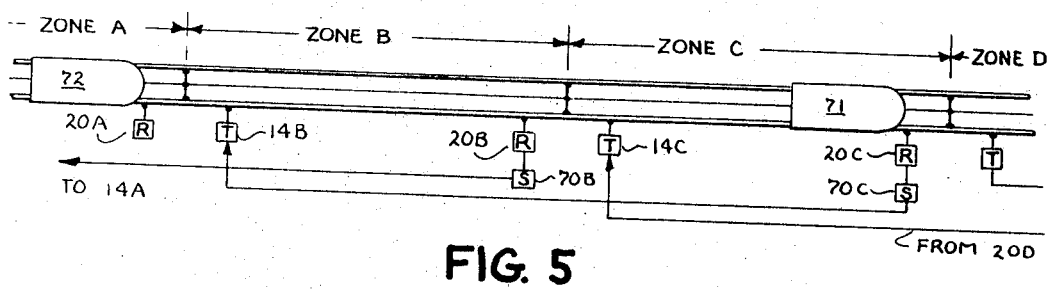
FIG. 5 is a fragmentary schematic view of the linkage between adjacent zones for relaying the detected information.

A system of relaying the output signal of receiving means output indicator 63 (FIG. 1) is illustrated in FIG. 5. The right of way is divided into a plurality of sequential zones comparable to the zones of FIG. 1. A transmitting means 14 and receiving means 20 comparable to those described in connection with FIG. 1 are located at opposite ends of each zone. The letters in FIG. 5 designate the zone with which each component is associated. A suitable switching means 70 is operably connected between the receiving means of one zone and the transmitting means of the adjacent zone. The switch, 70, for example could be a dynamic switch which, when activated, would vary the capacitance of the tank circuit of one of the transmitters, such as the $F_2$ transmitter 32 of the transmitting means 14 of the preceding zone. When an advance train 71 is present in zone C, for example, the output at 63 (FIG. 1) of the receiving means 20C will go either to zero or drop to a low level since the $E_1$ signal transmitted by zone C transmitter 14C will be shunted by the advance train 71. When the output at 63 (FIG. 1) goes to zero or drops to a low level, the switch 70C (FIG. 5) will be deactivated thus changing the frequency of, for example, the $F_2$ frequency generated by transmitter 32 (FIG. 1) of transmitting means 14B of the preceding zone. For example, when switch 70C is activated, the $E_2$ signal could be 300 c.p.s. and when deactivated 200 c.p.s. The signal in zone B would, therefore, be changed so that the succeeding train 72, on entering zone B, would thus be governed in accordance with the condition of traffic. That is, train 72 would receive a signal of 300 c.p.s. when zone C is unoccupied and 200 c.p.s. when zone C is occupied.

The frequency of the other transmitter, the $F_1$ transmitter 30 (FIG. 1) could be set to generate a frequency outside the range of the frequencies of $F_2$, such as for example 400 c.p.s. $F_2$ band pass filters 42 and 44 (FIG. 1) of the receiving means 20 could be relatively wide band filters adapted to pass frequencies of 200 and 300 c.p.s. $F_1$ band pass filter 40 could be a relatively narrow band pass filter adapted to pass frequencies at approximately 400 c.p.s. Thus, changes in frequencies $F_2$ would not affect the operation of the system.

A fail-safe system is also provided in that should there be a break in one or both of the rails or the third conductor, the final fault output at 65 of the receiving means would go to some voltage value providing an indication of a broken rail. An additional fail-safe device in the form of a voltage detector (not shown) could be inserted in parallel with the first output 63 (FIG. 1) of the receiving means 20 (FIG. 5) and connected to an over-riding switch (not shown) which could operate to deactivate switch 70 should the voltage output at 63 (FIG. 1) of the receiving means 20 (FIG. 5) rise above a predetermined level as would occur should the $E_2$ transmitter or receiver components fail thereby driving the ratio toward infinity.

Figure 6:
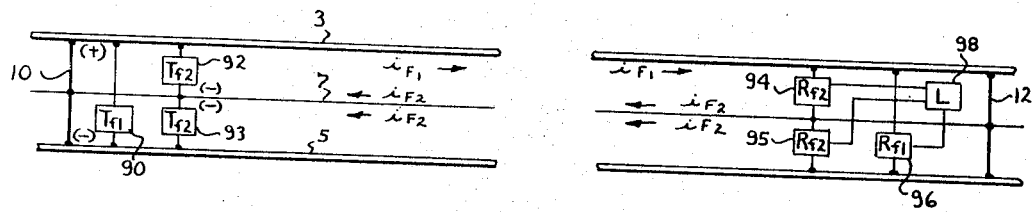
FIG. 6 is a fragmentary schematic view of a modification of the system.

Another method of differentiating between the change in circuit conditions caused by adverse weather from those caused by the presence of a train may involve measuring a current ratio. FIG. 6 shows an equivalent schematic representation wherein a signal at frequency $F_1$ is generated by transmitter 90, and signals at frequency $F_2$, arranged by suitable gain adjustment to be of the same magnitude, are transmitted by transmitters 92 and 93 and connected in the circuits with the polarities indicated by the plus and minus signs. The frequencies $F_1$ and $F_2$ may be selected sufficiently close that they affect the ballast and cross-tie impedance by substantially the same amount. Suitable current measuring means R shown generally at 94, 95 and 96 may be connected to the circuits as shown for measuring the amount of current at each frequency similar to that described hereinbefore when a train is present.

In the embodiment of FIG. 6, the wheels and axle short circuit the $F_1$ signal but not the $F_2$ signal. Thus the current at frequency $F_1$ is affected by both the presence of a train and by shunting effects due to weather. The current at frequency $F_2$, however, is affected only by the shunting effects due to weather. Thus, the ratio M of $i_{F_1}$ to $i_{F_2}$ provides an output which is independent of weather.

The output from current measuring means 94, 95 and 96 may be fed to a suitable logic device 98 which provides the ratio of $i_{F_1} \div 2i_{F_2}$. The logic device 98 may be normalized so that the ratio M of $i_{F_1} \div 2i_{F_2}$ is, for example, a value of 1 when signals are received from each of the current measuring means 94, 95 and 96—an event which occurs when no train is present and there is no break in the system. For example: $M = Ki_{F_1}/2i_{F_2}$ where K is the normalizing factor.

When no train is present in the zone, $M=1$, and remains so even under extreme variations of ballast due to changes in weather conditions since each circuit is generally affected the same by weather. When a train is present in the zone, $i_{F_1}$ is reduced, thereby making the ratio, M, less than 1. The logic means 98 may be adjusted to provide an output when the ratio M is approximately 1 and zero output when M deviates from 1 by a predetermined amount, say for example .7 or 1.3.

A fail-safe advantage is provided in that if the $F_1$ signal transmitted by the transmitting means 90 fails then M goes to zero and the system is fail-safe. If the $F_2$ signal transmitted by transmitting means 92 or 93 fails, or there is a break in one of the rails, the ratio M becomes very large, the output of logic means 98 goes to zero and the system is likewise fail-safe.

It is to be understood that instead of using different frequencies for each signal, the signals could be at the same frequencies but transmitted at different times (time multiplexing) and the receivers could be adapted to distinguish between the sequences. Similarly, a phase differential system could also be used in the transmission and receiving means instead of the frequency differential system shown and described as long as a polarity differential is detectable in accordance with the invention.

Having shown preferred embodiments of a novel train detection system which is independent of weather conditions, it is believed obvious that other modifications and variations of the invention are possible in the light of the above teachings.

What we claim as new and desire to secure by Letters Patent of the United States is:

1. In a rail vehicle zone occupancy detection system, a track circuit comprising: a pair of track rails; a conducting means disposed adjacent said rails; circuit forming means to establish a first circuit including one of said rails and said conducting means and a second circuit including the other of said rails and said conducting means; means to transmit one signal additively along said rails and another signal subtractively along said rails; receiving means adapted to receive said signals; and analyzing means associated with said receiving means for analyzing the signals received by the receiving means operative to indicate the presence or absence of a vehicle in the zone, said analyzing means including means to derive a ratio between one of said signals and the other of said signals received by said receiving means.

2. A rail vehicle zone occupancy detection system according to claim 1 including means associated with said means to derive said ratio to produce a first output when the said ratio is zero and a second output when the said ratio is other than zero.

3. A rail vehicle zone occupancy detection system according to claim 2 wherein said ratio is zero when said additive signal is not received by the receiving means and said first output is zero when said ratio is zero, and said ratio is other than zero when both said signals are received by the receiving means, and said second output is other than zero when said ratio is other than zero.

4. A rail vehicle zone occupancy detection system according to claim 1 including means associated with said analyzing means to produce one output when both of said signals are received by the receiving means and another output when at least one of the signals is not received by the receiving means.

5. In a rail vehicle zone occupancy detection system a track circuit comprising:
  (a) a pair of track rails;
  (b) a conducting means disposed adjacent said rails to provide a first circuit including one of said rails and said conducting means, and a second circuit including the other of said rails and said conducting means;
  (c) transmitting means disposed adjacent to said rails comprising first transmitting means for applying a first signal additively across said first and said second circuit and second means for applying a second signal subtractively across said first and across said second circuit;
  (d) receiving means displaced along said rails from said transmitting means comprising first receiving means providing a received first signal, second receiving means providing a received second signal; and
  (e) signal analyzing means coupled to said first and second receiving means providing an output representative of the relative magnitude of said received first and second signals to indicate the presence or absence of a vehicle in the zone.

6. A rail vehicle zone occupancy detection system according to claim 5 wherein the said signal analyzing means operates to distinguish between the receipt of only one of the signals and the receipt of both of the signals.

7. A rail vehicle zone occupancy detection system according to claim 6 wherein when only one of the signals is received, the signal analyzing means includes means to determine which of the said transmitted signals has been received.

References Cited

UNITED STATES PATENTS 1,687,111  10/1928  Skene.
2,089,836  8/1937  Martin _____ 246—34 X ARTHUR L. LA POINT, *Primary Examiner.*

G. H. LIBMAN, *Assistant Examiner.*

U.S. Cl. X.R.

246—122, 167, 187